United States Patent

Perkins et al.

[11] Patent Number: 5,836,170
[45] Date of Patent: Nov. 17, 1998

[54] VACUUM RELEASE VALVE TUBE ASSEMBLY

[75] Inventors: Travis M. Perkins, Evansville; Brian P. Kelley, Newburgh; Armon A. Adler, Haubstadt, all of Ind.

[73] Assignee: Whirlpool Corporation, Benton Harbor, Mich.

[21] Appl. No.: 865,315

[22] Filed: May 29, 1997

[51] Int. Cl.[6] ................................................. F26B 41/04
[52] U.S. Cl. ...................... 62/409; 137/526; 137/533.17; 137/533.31
[58] Field of Search .................... 62/331, 409, 410; 137/526, 533.17, 533.31

[56] References Cited

U.S. PATENT DOCUMENTS

| | | | |
|---|---|---|---|
| 2,373,046 | 4/1945 | Osborn, Jr. ............................... | 137/526 |
| 2,564,023 | 8/1951 | Miller .................................. | 137/533.17 |
| 3,027,735 | 4/1962 | Preotle et al. ............................ | 62/407 |
| 3,167,931 | 2/1965 | Bryson .................................... | 62/237 |
| 3,376,711 | 4/1968 | Hagendoorn et al. ..................... | 62/410 |
| 3,605,132 | 9/1971 | Lineback .................................. | 137/526 |
| 3,680,329 | 8/1972 | Burtis ...................................... | 62/275 |
| 3,696,632 | 10/1972 | Carlin et al. ............................. | 62/285 |
| 3,813,896 | 6/1974 | Lebahn .................................... | 62/409 |
| 3,952,542 | 4/1976 | Berkowitz ................................ | 62/409 |
| 4,257,445 | 3/1981 | Cook et al. .............................. | 62/412 |
| 4,662,270 | 5/1987 | Fiddler .................................... | 62/409 |
| 4,759,198 | 7/1988 | Yamada ................................... | 137/341 |

Primary Examiner—William E. Tapolcai
Attorney, Agent, or Firm—Thomas J. Roth; Andrea R. Powers; Robert O. Rice

[57] ABSTRACT

A vacuum release valve for use in a refrigerated compartment such as a domestic refrigerator which allows a small amount of outside air to enter the refrigerated compartment to prevent a vacuum from forming in the refrigerated compartment caused by warm air entering the compartment during door access into the compartment and then contracting by being cooled. The vacuum release valve includes a tubular valve body which penetrates through a floor of the compartment and a cap which is loosely captured to an end of the tubular body and which normally closes the tubular body but which can be lifted from the tubular body by a vacuum formed within the compartment.

10 Claims, 2 Drawing Sheets

VACUUM RELEASE VALVE TUBE ASSEMBLY

BACKGROUND OF THE INVENTION

The present invention relates to a refrigerated compartment having an access door for entering the compartment to place objects to be refrigerated therein, and particularly to a refrigerator for storing food items. Particularly, the invention relates to a vacuum release valve for equalizing pressure inside and outside of the compartment.

When an access door is opened on a refrigerated compartment, warm exterior air enters the compartment. As the warm air comes into contact with the cold interior surfaces of the compartment, the air cools and thus contracts causing a vacuum to exist inside the compartment. If the access door is desired to be opened again, particularly soon after closing the compartment, the vacuum inside the compartment increases the force required to open the door. In domestic refrigerators, this vacuum phenomenon was substantially increased after the introduction of foam-in-place doors. Foam-in-place doors allow less venting in the door area than the previous slab door design.

Prior known vacuum release devices were difficult and costly to install and included a multiplicity of parts. The prior known vacuum release device used a preformed foam tube which was required to be aligned between opposing holes in a liner panel and a metal deck to form an air path through a refrigerator floor. A plastic tube was needed within the foam tube to prevent the foam tube from distorting during a foaming operation to fill the space between liner and deck with foam insulation. A ring forming a valve seat and an engaged valve cap together snapped into the liner hole. The ring was mated to the plastic tube. A total of four parts were required and were all required to be U.L. approved for flammability.

SUMMARY OF THE INVENTION

It is an object of the present invention to provide a refrigerated compartment which eliminates or reduces the vacuum effect caused by contracting warm air inside the compartment. It is an object of the invention to provide a refrigerated compartment which has an access door which can be opened with a constant opening force. It is an object of the present invention to provide an effectively manufactured device for preventing or reducing the possibility of a vacuum occurring inside a refrigerated compartment wherein the device is small and easily installed into a refrigerated compartment. It is an object of the invention to provide a vacuum release valve assembly which uses a minimum number of parts for a reduction in assembly manpower and reduction in assembly repairs. It is an object of the invention to provide a vacuum release valve assembly which minimizes chances for valve actuation obstructions.

The objects of the invention are achieved by providing a refrigerated compartment such as a domestic refrigerator having a vacuum release valve assembly for communicating air from outside the refrigerated compartment to an inside thereof. The assembly is typically installed from inside the refrigerated compartment. The assembly provides an air channel through a plastic food liner, through the insulating foam, and through the external steel skin of the refrigerated compartment. The vacuum release valve assembly is comprised of a simple two piece assembly including a tubular valve body extending through a floor or wall of the refrigerated compartment, and a valve cap which can close the tubular housing but which is openable by a vacuum applied within the compartment. The valve cap allows air to flow from outside of the refrigerated compartment to an inside of the compartment, and not the reverse, and only during inside vacuum conditions. Absent vacuum conditions, the valve cap closes the valve body to isolate the compartment inside from the compartment outside. The cap allows for pressure equalization without compromising the overall effectiveness of the refrigeration product.

The vacuum release valve assembly is typically installed through a right rear corner portion of the floor of the refrigerated compartment. Other locations within the refrigeration compartment for the vacuum release valve assembly are feasible, including through one of the side walls, the back wall, the door, or the ceiling of the compartment.

An exemplary location and orientation of the vacuum release valve assembly is through the floor, oriented vertically. When the door is opened and warm air enters the compartment and thereafter contracts, contraction of the air due to the cold inside surfaces of the compartment, creates a sufficient vacuum to draw open the cap against the force of gravity, upwardly from the valve body to allow the entry of air into the compartment. The pressure equalization between inside and outside the compartment can be accomplished by allowing only a small amount of outside air to flow into the compartment, which does not compromise the performance of the refrigerated compartment. Once the pressure is equalized, the cap falls by force of gravity to reseat against the valve body.

The present invention two piece assembly allows for an effective manufacturing of an insulated panel, such as a refrigerator floor. The tubular valve body snaps into a hole in the liner and spans between the liner and a floor deck of the refrigerator. The space between the liner and floor deck can then be foamed to integrate floor deck, foam insulation, vacuum release valve and liner.

DETAILED DESCRIPTION OF THE PREFERRED EMBODIMENTS

Figure 1:
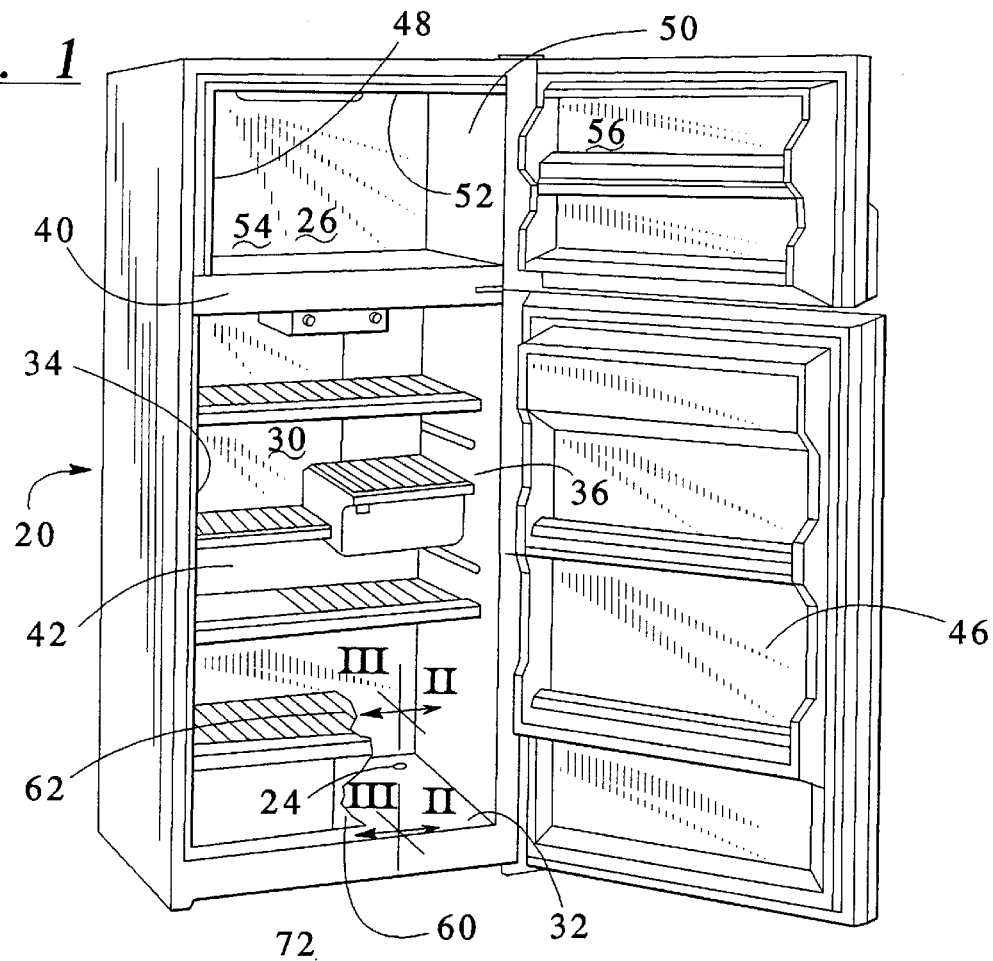
FIG. 1 is a perspective view of a domestic refrigerator/freezer incorporating a vacuum release valve according to the present invention.

FIG. 1 illustrates a domestic type refrigerator/freezer 20 incorporating a vacuum release valve 24 of the present invention.

The refrigerator/freezer 20 includes a top mounted freezer compartment 26 and a underlying refrigerator compartment 30. Although the vacuum release valve 24 is shown mounted in the refrigerator compartment 30 such a valve could also be mounted in the freezer compartment 26 or one valve could be mounted in each compartment. Typically, however, a single vacuum release valve 24 mounted in the refrigerator compartment 30 is satisfactory to release vacuum in both compartments as the compartments are air flow connected.

The refrigerator compartment 30 is defined by walls including a floor 32, opposing side walls 34, 36, an intervening wall 40 between the refrigerator compartment 30 and the freezer compartment 26, and a back wall 42; and a hinged door 46. The freezer compartment 26 is defined by walls including the intervening wall 40, opposing side walls 48, 50, a top wall 52, and a back wall 54; and a hinged door 56.

A portion of a vegetable bin 60 and overlying tray 62 have been removed to give visual access to a back of the floor 32 to illustrate the position of the vacuum release valve 24.

Although the vacuum release valve 24 is shown on the floor 32, the release valve 24 can conceivably be made to function adequately if installed on any wall which penetrates through the enclosed compartment 30, or 26. For example, the vacuum release valve 24 could penetrate through the side wall 36, the side wall 34, or the back wall 42 in the refrigerator compartment 30; or penetrate through the side wall 48, side wall 50, ceiling 52, or back wall 26 of the freezer compartment. Conceivably also, the vacuum release valve 24 would function if installed onto the hinged doors 46, 56. Where force of gravity is not present to close the cap 72 to the valve body 70, a spring or equivalent means can be used to urge the cap 72 to the tube 70.

Figure 2:
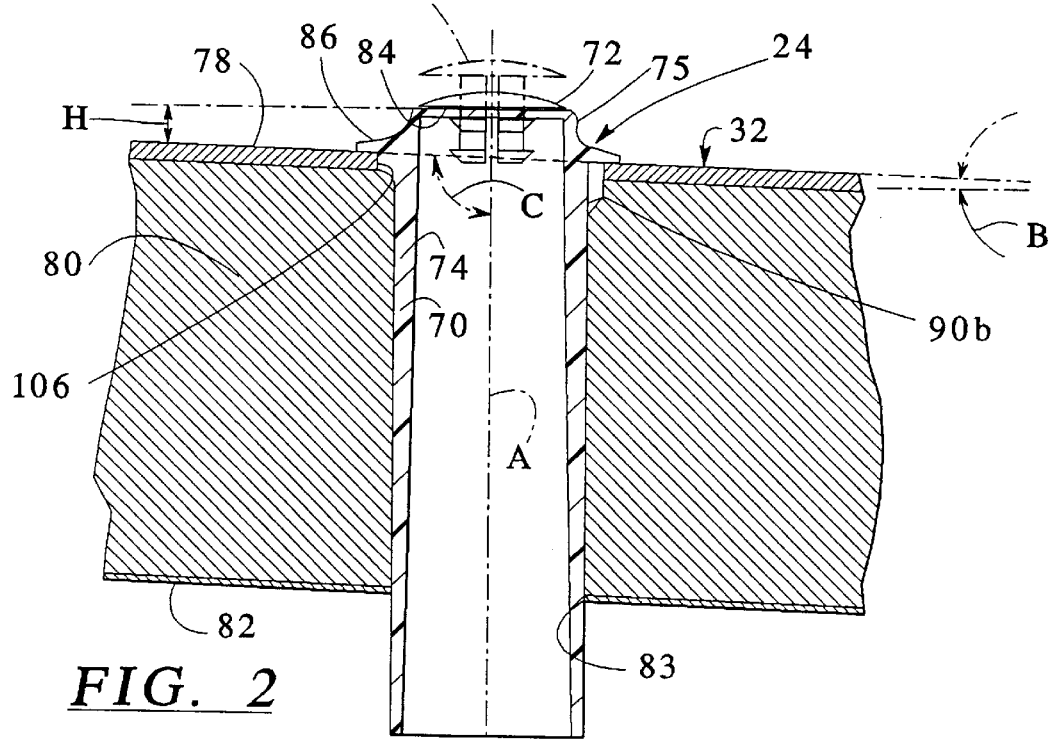
FIG. 2 is a sectional view taken generally along line II—II of FIG. 1.

FIG. 2 illustrates the construction of the vacuum release valve 24 as including a valve body 70 selectively closed by a cap 72 shown solid in closed condition and shown dashed in open condition. The cap 72 is loosely captured on the body 70 and allowed to vertically reciprocate. The valve body 70 includes a tubular portion 74 having a first end 75 and a second open end 76 and extends through the floor 32. The floor 32 includes the internal plastic liner 78, foam insulation 80 and a metallic skin 82 such as a floor deck, which would be the exterior layer. The foam insulation 80 is typically foamed in place construction. The valve member 24 can be inserted into an aperture 106 described in FIG. 6, and through an aperture 83 formed through the skin 82 before foaming such that the foam 80 can surround the tube 74 to integrate the tube 74 into the floor construction. On the first end 75 of the tube 74 toward the interior of the refrigerator compartment 30 is the valve seat 84 substantially closing the tube 74, and a surrounding flange 86. The flange 86 is pressed against the plastic liner 78 to assist in sealing against the floor 32 for air, and also for sealing foam during the foam-in-place insulation installation. The flange 86 is arranged such that the valve seat 84 is at a height H above the floor 32 to prevent contamination of the valve 24 by spilled food or liquids accumulated on the liner 78. The height H is advantageously ¼–⅜ inch.

Also shown at a bottom side of the tube 74 adjacent the flange 86 is a lug 90b for locking the tube 74 in a particular orientation about its axis A. The tube axis A is inclined obliquely with respect to the skin 78. The skin 78 has a molding "draft" at a downward angle B (about 2.8°) which results in the floor 32 stopping downwardly forwardly, toward the door 46 when closed. To insure verticality of the tube 74, the tube 74 and flange 86 are also angled at the angle C=B+90°.

Figure 3:
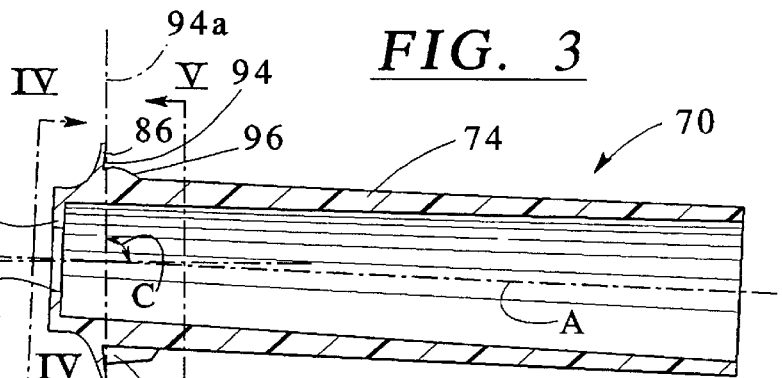
FIG. 3 is a longitudinal sectional view of a valve body taken generally along line III—III of FIG. 1.

FIG. 3 illustrates the valve body 70 shown in FIG. 2 as a separate part. The valve seat 84 includes an engagement aperture 92 for retaining the cap 72 as will be described below. The flange 86 has a vertical annular sealing face 94 which is in a plane 94a which is oblique rather than normal to the axis A of the tube 74. The angle C between the plane 94a and the axis A is greater than 90° by approximately 2.8° as viewed in FIG. 3. This ensures tube verticality as described with respect to FIG. 2. Surrounding the tube 74 between the two lugs 90a, 90b is a raised collar 96 which grippingly holds the plastic liner 78 against the sealing face 94 when the tube 74 is inserted into the back wall 42. This is particularly advantageous to hold the tube 74 in place during foaming of the floor 32.

Figure 4:
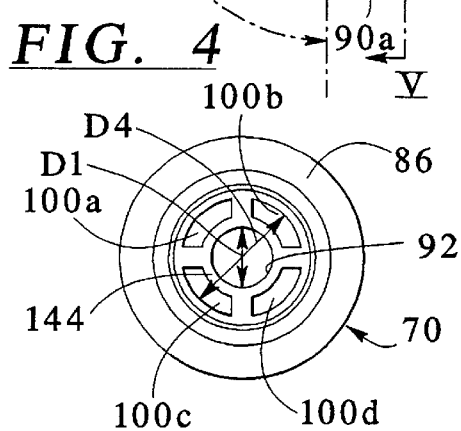
FIG. 4 is a left end view of the valve body shown in FIG. 3 taken generally along line IV—IV.

FIG. 4 shows an end view of the valve body 70 including the engagement aperture 92 and four surrounding arc section apertures 100a, b, c, d.

Figure 5:
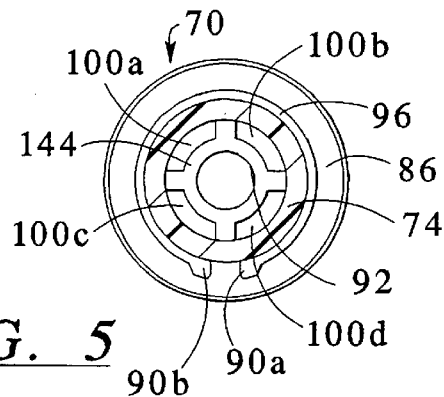
FIG. 5 is a sectional view taken generally along line V—V of FIG. 3.

FIG. 5 is a sectional view which illustrates the four arc section apertures 100a, b, c, d open to an inside of the tube 74, and the engagement aperture 92 approximately centrally thereof. The lugs 90a, 90b are shown transitioning into the collar 96.

Figure 6:
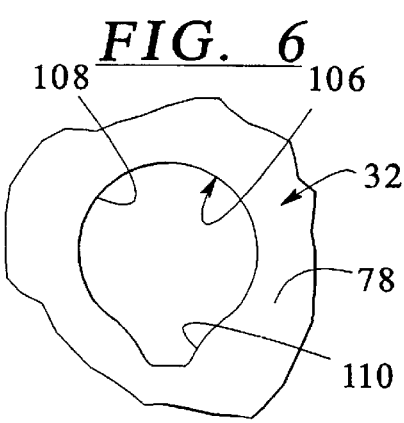
FIG. 6 is a partial elevational view of a hole structure which receives the valve body as shown in FIG. 2.

As shown in FIG. 6, a somewhat oval aperture 106 is formed through the plastic liner 78 for receiving and engaging the tube 74 of the valve body 70. The aperture 106 includes a general oval portion 108 which tightly engages the collar 96, and at a bottom of the aperture 106 is a keyed portion 110 which receives the lugs 90a, 90b to orient the valve body 70 within the aperture 106 and prevents any rotation thereof so that the tube 74 is seated at true verticality during installation. This is particularly advantageous for holding the valve body 70 into the floor 32 at a correct orientation during foaming-in-place to integrate the valve body 70 into the floor 32.

Figure 7:
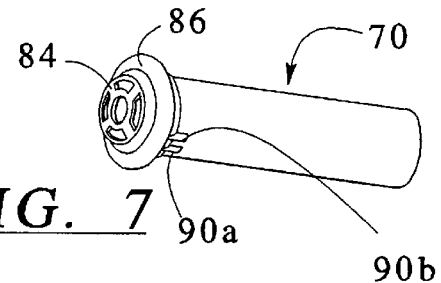
FIG. 7 is a perspective view of the valve body shown in FIGS. 3—5.

FIG. 7 illustrates in perspective view, the valve body 70 as a separate part.

Figure 10:
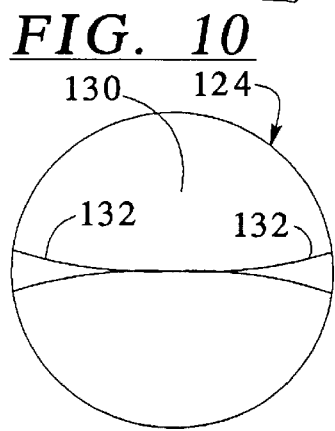
FIG. 10 is a left end view of the valve cap shown in FIG. 8.
Figure 8:
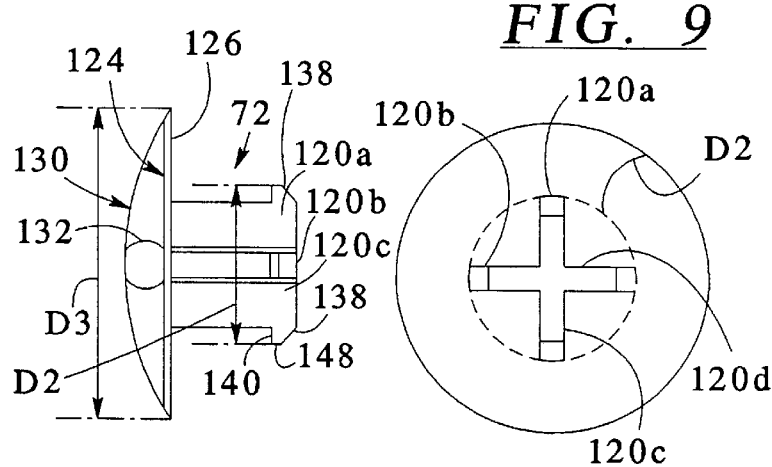
FIG. 8 is a side view of a valve cap of the vacuum valve shown in FIG. 2.
Figure 9:
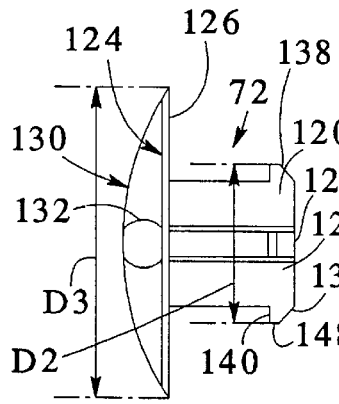
FIG. 9 is an end view of the valve cap shown in FIG. 8.

FIG. 8 describes the valve cap 72 which snap engages into the valve seat 84 of the valve body 70 shown in FIGS. 3–5 and 7. The cap provides hook portions 120a, b, c, d arranged in a general cross pattern and extending from a disk member 124 having a flat annular surface 126 on one side, and a shaped surface 130 on an outside thereof. The shaped surface 130 includes a bar portion 132 shown also in FIG. 10, for handling the part during assembly. The hook portions 120a, 120d include inclined leading edges 138 which assist in reducing a hook pattern diameter D2, as shown dashed in FIG. 9, and/or stretching open the engagement aperture diameter D1 during insertion so that the four hooks 120a, 120d can be interfit within the engagement aperture 92 when the cap 72 is pressed into the valve seat 84. The hooks spring back once passed into the aperture 92 so that confronting ledges 140 of each hook 120a–120d underlie a ring portion 144 of the seat 84 as shown in FIG. 4. That is, the aperture 92 has a clear diameter D1, as shown in FIG. 4, which is less than a diameter D2 of the outer edges 148 of the hooks 120a, 120d in a relaxed condition.

The annular sealing surface 126 is sized having a diameter D3 sized to be greater than a diameter D4 shown in FIG. 4 which corresponds to the clear open area of the four arc sector apertures 100a–100d. Thus, the sealing surface 126 closes the apertures 100a–100d when the cap is in its closed condition. The cap is closed by force of gravity. If the vacuum release valve is mounted in a orientation such as through a wall where the force of gravity would not assist in its closing, a spring or similar device can be provided to urge the cap 124 against the seat 84.

The valve body 70 and cap 72 are advantageously composed of plastic such as linear low density polyethylene.

Although the present invention has been described with reference to a specific embodiment, those of skill in the art will recognize that changes may be made thereto without departing from the scope and spirit of the invention as set forth in the appended claims.

The embodiments of the invention in which an exclusive property or privilege is claimed are defined as follows:

1. A refrigerated apparatus comprising:

a compartment formed by walls and a floor and having an open front closed by a door;

refrigeration apparatus for cooling air within said compartment; and a vacuum release valve including a single piece tubular body having open ends and sized to extend through a thickness of one of said walls and a cap closing said tubular body but liftable off said body by air pressure outside said compartment, communicating air from outside of said compartment to inside said compartment to prevent a lower than ambient air pressure inside said compartment; the vacuum release valve being disposed substantially vertically through the floor.

2. The refrigerated apparatus according to claim 1, wherein said cap is loosely captured to an open end of said tube, said cap displacable to open said end of said tube by differential pressure on opposite sides of said cap.

3. The refrigerated apparatus according to claim 2, wherein said tube comprises an integrally formed, surrounding flange for sealing against an inside surface of said compartment.

4. The refrigerated apparatus according to claim 2, wherein said cap comprises a plurality of hook portions extending into said open end of said tube, and said tube has a valve seat arranged on said end thereof, said hook portions engageable to said valve seat to hold said cap loosely onto said valve seat.

5. The refrigerated apparatus according to claim 4, wherein said valve seat comprises a central aperture for receiving said hook portions and surrounding apertures normally covered by said cap but openable by lifting of said cap from said valve seat.

6. A vacuum release valve for a refrigerated compartment having side walls and a floor comprising:

a single piece tube means sized and arranged to penetrate through a liner of said compartment, said tube means having opposite open ends and forming a channel communicating therebetween;

a closure means for covering a first of said open ends of said tube means that is open to an interior of said compartment, said closure means normally closed against said open end and openable when said pressure inside said compartment is less than surrounding ambient pressure outside said compartment; the vacuum release valve being disposed substantially vertically through the floor.

7. The vacuum release valve according to claim 6, wherein said tube means comprises a straight tube having an annular flange surrounding said straight tube adjacent said first open end and a valve seat overlying said first open end, said valve seat providing a central aperture and surrounding apertures; and said closure means comprises a cap having an engagement means extending centrally thereof for engaging said central aperture of said valve seat, said cap sized to cover said surrounding apertures and said central aperture, said engagement means loosely connecting said cap to said tube to be displaced off said valve seat when said pressure inside said compartment is less than the pressure outside said compartment.

8. The vacuum release valve according to claim 7, wherein said engagement means comprises a plurality of hook portions arranged in a pattern and resiliently collapsible to allow entry of said hook portions into said central aperture of said valve seat, and resiliently rebounding to confront stationary portions of said valve seat to prevent said cap from being separated from said valve seat once engaged.

9. A vacuum release valve for refrigerated compartment comprising:

a tube means sized and arranged to penetrate through a liner of said compartment, said tube means having opposite open ends with a channel communicating therebetween, and said tube means comprising a straight tube having an annular flange surrounding said straight tube adjacent said first open end, and a raised collar substantially surrounding said straight tube on a side of said flange opposite first open end, said raised collar arranged to grip a liner of said compartment to said flange when said valve is installed;

a closure means for covering a first of said open ends of said tube means that is open to an interior of said compartment, said closure means normally closed against said open end and openable when said pressure inside said compartment is less than surrounding ambient pressure outside said compartment.

10. The vacuum release valve according to claim 9, wherein said straight tube has a lug portion adjacent said flange at a preset rotary position on said flange, said lug portion arranged to key a correct rotary position of said straight tube with respect to said liner, an axis of said straight tube and a plane of said flange arranged at an oblique angle.

* * * * *